(12) United States Patent
Sell et al.

(10) Patent No.: US 10,299,072 B2
(45) Date of Patent: May 21, 2019

(54) LOCALIZED NETWORK SERVICE

(71) Applicant: Telefonaktiebolaget LM Ericsson (publ), Stockholm (SE)

(72) Inventors: Frank Sell, Vaals (NL); Tim Lauterbach, Kerkrade (NL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 10 days.

(21) Appl. No.: 15/549,207

(22) PCT Filed: Mar. 2, 2015

(86) PCT No.: PCT/EP2015/054258
§ 371 (c)(1),
(2) Date: Aug. 7, 2017

(87) PCT Pub. No.: WO2016/138919
PCT Pub. Date: Sep. 9, 2016

(65) Prior Publication Data
US 2018/0048993 A1    Feb. 15, 2018

(51) Int. Cl.
*H04L 29/08*    (2006.01)
*H04W 4/021*    (2018.01)

(52) U.S. Cl.
CPC ............. *H04W 4/021* (2013.01); *H04L 67/18* (2013.01)

(58) Field of Classification Search
CPC ..... H04W 4/021; H04W 16/14; H04W 4/028; H04W 64/00; H04W 72/04;
(Continued)

(56) References Cited

U.S. PATENT DOCUMENTS

| | | | |
|---|---|---|---|
| 2009/0298505 A1 | 12/2009 | Drane et al. | |
| 2013/0065613 A1* | 3/2013 | Stopel | H04W 4/18 455/456.3 |
| 2015/0148060 A1* | 5/2015 | Parab | H04W 4/021 455/456.1 |

FOREIGN PATENT DOCUMENTS

| | | |
|---|---|---|
| WO | 2013189974 A2 | 12/2013 |
| WO | 2014094843 A1 | 6/2014 |
| WO | 2015131927 A1 | 9/2015 |

OTHER PUBLICATIONS

Chang, G. et al., "A Region-based Hierarchical Location Service with Road-adapted Grids for Vehicular Networks", 39th International Conference on Parallel Processing Workshops, Sep. 13, 2010, pp. 554-561.

* cited by examiner

*Primary Examiner* — Kwasi Karikari
(74) *Attorney, Agent, or Firm* — Coats & Bennett, PLLC

(57) ABSTRACT

Providing a network service to at least one mobile terminal inside a service area, the at least one mobile terminal being arranged to communicate with a communication network, the service area being a part of a geographical area that is covered by the communication network, comprising defining, by a first grid process, a first grid with first grid lines, the first grid covering at least a part of the service area with one or more tiles framed by the first grid lines; defining, by a second grid process, a second grid with second grid lines, the second grid covering at least a part of the service area with one or more tiles framed by the second grid lines; monitoring a crossing, by the at least one mobile terminal, of a grid line; and determining whether said grid line is a first grid line or a second grid line for notifying correspondingly the first grid process and/or the second grid process.

22 Claims, 6 Drawing Sheets

(58) Field of Classification Search
CPC ......... H04W 36/0016; H04W 36/0072; H04W 36/32; H04W 4/025; H04W 64/006; H04W 48/20; H04W 4/027; H04W 4/08; H04W 88/12; H04W 8/12
See application file for complete search history.

LOCALIZED NETWORK SERVICE

TECHNICAL FIELD

The present invention relates to providing a network service to a plurality of mobile terminals that are arranged to communicate with a cellular communication network. The present invention specifically relates to providing a network service in tiles of a grid that cover a service area in which said network service is to be provided. The present invention also relates to a corresponding network entity, a corresponding network system, a corresponding computer program, and a corresponding computer program product.

BACKGROUND

It is known to provide so-called Location Based Services (LBS) in cellular communication networks, such as a cellular wireless telephone network. Such services typically comprise a mechanism for estimating the location of a mobile terminal, e.g. with the help of satellite-based positioning systems (GPS, Galileo, Glonass, etc.) and/or a Mobile Positioning System (MPS). Said LBS mechanisms are known to enable content delivery based on the location of a user or a vehicle (mobile terminal). Based on the knowledge of the mobile terminal's location, specific location based services can be offered to said mobile terminal, e.g. alert messages for upcoming road traffic hazards or indications toward deviations to avoid traffic jams. In these examples the user is a vehicle with a respective mobile terminal on board. Generally, it may be referred to as a "network service" for the above location based services, i.e. a network service in the context of the present disclosure is any service to or about mobile terminals that consider directly or indirectly their respective position.

It is further known to broadcast information with the help of so-called Cell Broadcast Services (CBS), in order to distribute information to mobile terminals within one or more cells. The respective mobile terminals have to enable the listening of the respective broadcast channel. A so-called Multimedia Broadcast and Multicast Service (MBMS) is known that provides a broadband broadcast to mobile terminals. Such data communication in cellular communication networks is, however, dominated by using a request response communication mechanism that is triggered by the mobile terminal, or point-to-point (P2P) data communication using Short Message Service (SMS) and Multimedia Message Service (MMS). Further, said LBS technologies or the aforementioned broadcast technologies are being introduced for enabling an enriched request response communication.

One possible implementation of an LBS uses a grid formed by grid lines so as to define grid fields, or tiles, that are framed by the grid lines. Usually, four grid lines form at least one tile of a square-like, rectangular, or any 4-polygon-like shape. The grid, the grid lines, and the tiles can be defined so as to cover a given service area with one or more tiles. Said service area may consist of one or more contiguous areas of arbitrary shape in which said network service is to be provided or is active. An example can be a circular service area covering a road intersection. In general, the service area is independent from the grid, the grid lines, and thus also from the tiles.

Such network services may involve information indicting the position and the extension of the grid lines, crossing information indicating that a mobile terminal has crossed a grid line, i.e. indicating that the mobile terminal has entered or left a specific tile, and tile information for keeping track of what mobile terminals are currently inside what tile. Said information concerning the grid lines may be conveyed to the mobile terminals so that a crossing of one grid line can be detected by the mobile terminal. Such crossing may trigger the generating and sending of said crossing information to the network side (e.g. a responsible target network entity). Correspondingly the network side can keep track of what mobile terminal(s) are in what tile for maintaining said tile information.

When the network service is to send any information (e.g. a message, such as a traffic hazard warning) to some or all mobile terminals that are currently inside a given service area, it can be referred to the tile information so as to determine all the mobile terminals that are inside the tiles that cover the specific service area. Referring to said tile information can also yield an identification of all the target mobile terminals. Thus, messages can be then sent only to these target mobile terminals ensuring that the right terminals are addressed, e.g. the ones that may be affected by a warning, and that—at the same time—unnecessary communication to mobile terminals outside the service area is avoided.

Such conventional concepts usually deploy tiles with a fixed size so that a constant number of tiles cover a given service area. Further, such conventional concepts consider the splitting of one or more tiles in order to maintain a somewhat leveled distribution of clients per tile in cases that clients, or mobile terminals, accumulate at some parts of the service area. For example, a service area covering also a road junction/intersection may be provided with split tiles in the vicinity of that intersection to take into account the effect that more vehicles will probably be located around the intersection as compared to the remaining parts of the service area (i.e. the approaching roads).

However, these conventional concepts rely on one grid process that monitors crossing of grid lines and that involves corresponding crossing notification messages regardless of the type of grid line being crossed. There is, therefore, no possibility to implement different types of message and information flows for different, possibly also completely independent, grids. Therefore, there is a need for improved concepts of providing grid-based localized network services that allow for a more efficient distribution of the involved messaging and processing resources to the involved devices and interfaces between the individual terminals on the one end and the network side toward the other.

SUMMARY

The above mentioned problems and drawbacks of the conventional concepts are solved by the subject-matter of the independent claims. Further preferred embodiments are described in the dependent claims.

According to an aspect of the present invention there is provided, a method for providing a network service to at least one mobile terminal inside a service area, the at least one mobile terminal being arranged to communicate with a communication network, the service area being a part of a geographical area that is covered by the communication network. The method comprises the steps of: defining, by a first grid process, a first grid with first grid lines, the first grid covering at least a part of the service area with one or more tiles framed by the first grid lines; defining, by a second grid process, a second grid with second grid lines, the second grid covering at least a part of the service area with one or more tiles framed by the second grid lines; monitoring a crossing, by the at least one mobile terminal, of a grid line; determining whether said grid line is a first grid line or a second grid line for notifying correspondingly the first grid process and/or the second grid process.

According to another aspect of the present invention, there is provided a network entity providing a network service to at least one mobile terminal inside a service area, the at least one mobile terminal being arranged to communicate with a communication network, the service area being a part of a geographical area that is covered by the communication network, the network entity comprising a processing unit that is configured to define, as part of a first grid process, a first grid with first grid lines, the first grid covering at least a part of the service area with one or more tiles framed by the first grid lines; define, as part of a second grid process, a second grid with second grid lines, the second grid covering at least a part of the service area with one or more tiles framed by the second grid lines; cause a monitoring, by the at least one mobile terminal, of a crossing of a grid line; and to cause a determining whether said grid line is a first grid line or a second grid line for notifying correspondingly the first grid process and/or the second grid process.

According to another aspect of the present invention, a network system is provided in which a network service is provided to a plurality of mobile terminals, the network system comprising at least one mobile terminal and a network entity of one of the embodiments of the present invention.

According to another aspect of the present invention a computer program that comprises code is provided, the code, when executed on a processing unit, instructs the processing unit to perform a method embodiment of the present invention.

According to another aspect of the present invention a computer program product that stores a code is provided, the code, when executed on a processing unit, instructs the processing unit to perform a method embodiment of the present invention.

BRIEF DESCRIPTION OF THE DRAWINGS

Embodiments of the present invention, which are presented for better understanding the inventive concepts but which are not to be seen as limiting the invention, will now be described with reference to the Figures in which.

DETAILED DESCRIPTION

Figure 1A:
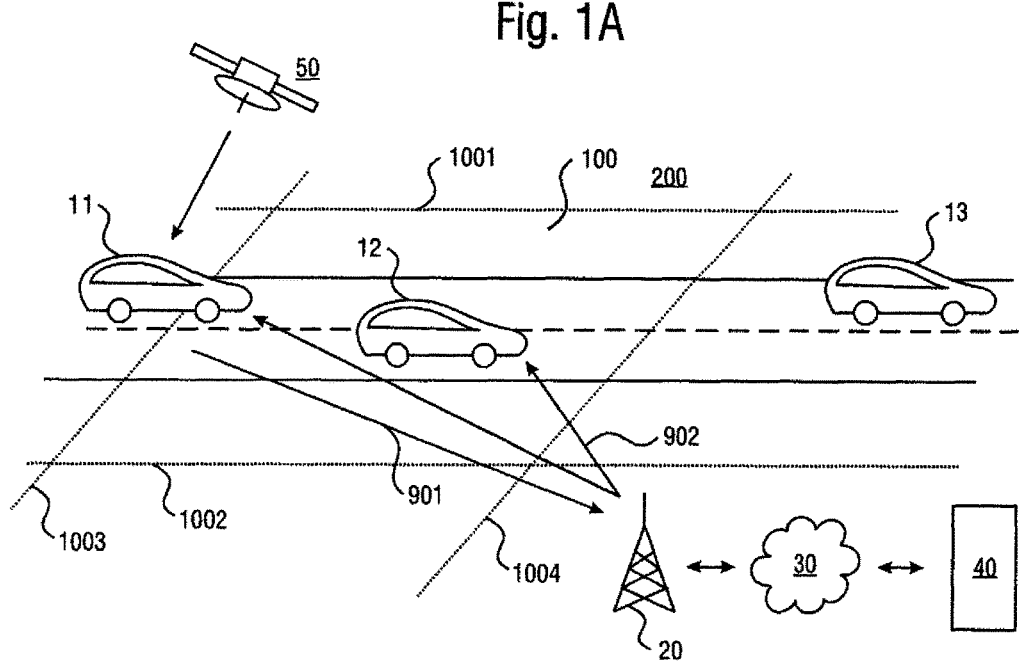
FIG. 1A shows a schematic view of an in-field implementation of a network service according to an embodiment of the present invention.

According to the embodiments of the present invention, a network service is generally a service or functionality that is provided to or with the mobile terminals of a wireless communication network, such as a cellular communication network. The network service can be specifically provided to those mobile terminals that are located inside some defined service area, which, in turn, forms part of the coverage area of the communication network, i.e. the area in which a mobile terminal can communicate (send and/or receive data) with the network. The circumstance that the network service is provided to terminals inside a given service area may imply that the service is not provided, or not available, to mobile terminals outside this service area. In a sense, the network service can be thus a localized service that addresses the mobile terminals as a service recipient based on location, e.g. on information whether the mobile terminal is inside or outside a given geographical service area.

Examples for such localized network services include services that provide mobile terminals with specific information based on and tailored to their respective locations. Such information may relate to traffic hazard warnings or specific route deviation proposals when the respective mobile terminal's location results in a possible involvement with such traffic hazards and/or traffic jams. Further, network service can make use of some kind of grid field information for determining mobile terminal density (e.g. corresponding to a vehicle density) within a specific geographical area and/or services for providing traffic authorities with information on such vehicle densities on specific motorways or in the vicinity of a specific junction. In such cases, information can be maintained in a database that reflects the number of mobile terminals in one grid tile. This information can be updated upon receiving corresponding crossing notifications. From the above it becomes clear that the network service may not necessarily involve sending of messages or broadcasting of information to the mobile terminals at all. In such cases, the network service is provided with, or involving the mobile terminals in the sense that the service uses their location data for other purposes than sending data to the terminals. Rather, another entity, possibly external and distinct from the communication network and its operator, can be provided with location based data. For example, a corresponding network service can provide a traffic authority with density data based on the location data. Such data advantageously provided in an anonymized fashion, so that any more detailed data, e.g. identification data of the mobile terminals inside some given tile, can be kept inside the network side and needs not to be provided to external entities.

Further within the meaning of the present invention, the terms vehicle, user, and mobile terminal are used synonymously, since a user may possess a mobile terminal, and a mobile terminal may be on board of a vehicle operated by the user, so that in the context of the present invention the geographical position of all the vehicle, the user, and the mobile terminal usually coincide.

FIG. 1A shows a schematic view of an in-field implementation of a network service according to an embodiment of the present invention. The basic concept of a localized network service (LBS) here is the application of a first grid forming a grid tile 100 by means of grid lines 1001, 1002,

1003, and 1004. The grid covers a part of the coverage area 200 provided by a wireless mobile communication network infrastructure 20. In this example, vehicles 11, 12, and 13 travel along a road, such as a multi-lane highway. The vehicles may have access to a satellite-supported positioning service 50, such as the ones known by Global Positioning System (GPS), Galileo, Glonass, or other services that allow for a determination of a terminal's geographical position. Access to this service 50 may require equipment on each vehicle 11, 12, and 13, adapted to receive signals from one or more satellites and to compute information that indicates a geographical position from the received signals.

The localized network service 40 may be provided by means of some sort of entity (server, processing resource of a data center and/or network node, etc.) that is linked to the network infrastructure 20 by means of network 30, e.g. the internet. In an alternative embodiment, such an entity may be located inside the realm of the communication network as such, so that network 30 and service 40 will denote another part of the communication network infrastructure. The network service may then employ a first grid process that, amongst others, defines the first grid by means of the mentioned first grid lines 1001 to 1004. In the shown example, the first grid tile 100 is formed by respective grid lines 1001, 1002, 1003 and 1004. Naturally, further adjacent grid tiles are formed by further and subsequent and grid lines.

Generally, it may be assumed that mobile terminals can or need to register so as to be provided with or participate with the network service, so that, for example, the service is accessible only to these registered mobile terminals. Likewise, embodiments may be envisaged that do not require registering of client terminals, so that every mobile terminal at the right location and with the suitable capabilities can form part of the network service. In any way, it is assumed in shown scenario that terminals/vehicles 11-13 have already been provided with first grid information so that they are able to determine a corresponding grid line crossing. Said grid information may be composed of reference point information and information on the respective first grid spacing. With this information and by monitoring their geographical location via the satellite-supported positioning service 50 the mobile terminals 11-13 are able to determine if they cross a first grid line 1001, 1002, 1003, or 1004.

As shown, vehicle 11 is about to cross the first grid line 1003. Vehicle 11 determines such a crossing based on position information retrieved from the satellite-supported positioning service 50 and the knowledge of the position and extension of the first grid line 1003. This may trigger crossing information to be generated and sent via a related notification 901 (message) toward the network side 20, 30, 40. The network side may thus be aware of vehicle 11 having just entered tile 100. It is, therefore, able to maintain tile information for at least tile 100, the information comprising identification information of the one or more mobile terminals (here the mobile terminals on vehicles 11 and 12), when inside tile 100.

Assuming the network service providing some location specific messaging to respective target mobile terminals, the service can thus refer to the tile information for determining target terminals, for example all terminals that are inside a given tile, say within tile 100. In this way, a payload message 902 can be specifically sent to vehicles 11 and 12, whereas no communication needs to be performed with vehicle 13. An example may be a notification of slippery road conditions inside tile 100, or, generally, any information being of interest to the vehicles 11 and 12 in tile 100. Since vehicle 13 has already crossed the first grid line 1004 and is outside tile 100, no message 902 is sent to this vehicle, since it is not considered as a target in this exemplary scenario. In this way, not only bandwidth can be saved, but also the driver of vehicle 13 is not distracted by receiving a message 902 that may not be of interest.

In any way, the above concept provides the possibility that all mobile terminals for which the respective payload message is of interest receive the respective notification 902, whereas other terminals are not disturbed/distracted by information that is not relevant to them. While the basic concept of the network service was described in FIG. 1A with a single grid, i.e. the above first grid, the embodiments of the present invention apply at least two grids that may be independent from each other. Generally, the first grid is defined by a first grid process and a second grid is defined by a second grid process. Further details of this coexistence of grids are given in conjunction with the remaining figures, specifically in conjunction with the FIGS. 2A to 2C.

Figure 1B:
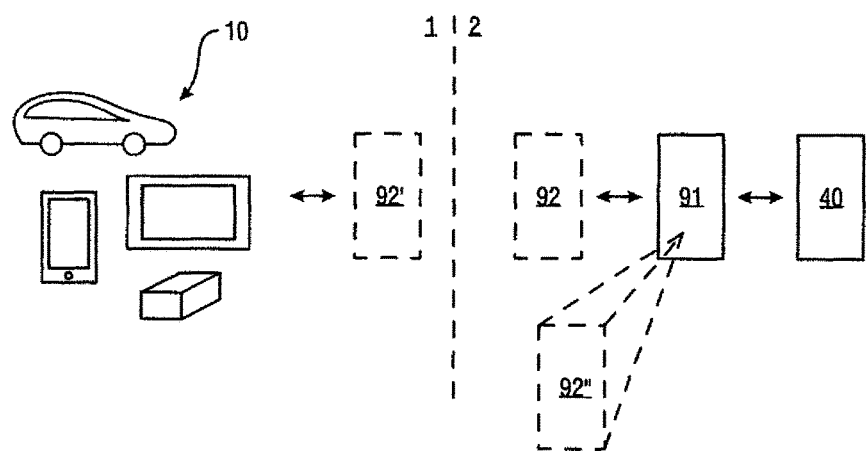
FIG. 1B shows a schematic view of functionality arrangements according to further embodiments of the present invention

FIG. 1B shows a schematic view of functionality arrangements according to further embodiments of the present invention. Generally, the system architecture can be divided into two sides, namely into a mobile terminal side 1 and a communication network side 2. The network service 40 employs a first grid process 91 and a second grid process 92 for the terminals 10. According to the embodiments of the present invention, these first and second grid processes are in principle independent from each other, so that they can not only define and spawn different, independent grids, but they can also be located (executed) on different resources in the arrangement. While one process, here the first grid process 91, is assumed to run on the communication network side 2, the second grid process may run on the same communication network side 2 as the second process 92 or on the mobile terminal side as the second process 92'. In a further alternative, the second process may be even part of the first process 91 as second process 92". These alternatives are to highlight the flexibility and, with this, the substantial gain in resource efficiency as provided by the present embodiments.

In any way, however, the shown configuration envisages that the first grid process 91 for defining the first grid is located at the communication network side 2 and is thus carried out by one or more entities of this communication network side 2. In the case of the second process 92, another entity but still on the communication network side 2 is employed for running the second grid process. At this point, however, it becomes clear that the second grid processes 92, 92' and 92" can be in any way located "closer" to the mobile terminal side 1 than the first grid process 91. This implies that messaging involved in the second grid process between the terminal 10 and process 92 does not need to penetrate through the first grid process 91. Communication resources between the location of the first grid process 91 and the location of the second grid process 92 can thus be saved or released to other purposes.

Especially in the case that the second grid process involves more messaging and communication resources, for example because the second grid is finer as compared to a more coarse first grid and correspondingly more crossing events take place and are reported, this approach avoids increased bandwidth occupancy between the second process 92 and the first process 91. In other words, intermediate sections of processing and information flow can be defined along the (somewhat linear) communication route between the network service 40 and the target terminals 10.

In a way, any communication intense processes, such as a finer second grid process 92, can be pushed toward the terminal side so as to minimize bandwidth occupation toward entities deeper in the network side. This effect can be further enhanced in the case of the second grid process 92" located at the mobile terminal side 1. The second grid process 92" is then carried out by at least one entity at this mobile terminal side 1 or even by the mobile terminal 10 itself. The mobile terminal can be any kind of a mobile phone, smartphone, portable computer, navigation system, or the like, so that it can be provided with the functionality to run the second grid process. For example, an app can be downloaded to and/or installed at a mobile terminal so as to execute the second grid process.

Generally, a grid process involves one or more functionalities of defining the grid, changing the grid spacing, changing a reference point, maintaining grid tile information, detecting events, receiving requests, processing and/or buffering data, issuing notifications, observing thresholds, and the like. In this way, for example, a fine high resolution second grid process can be implemented toward the mobile terminals (or thereon), while a more coarse first grid process is implemented somewhere in the communication network side 2. The high resolution data can be maintained and observed at locations close to the mobile terminals 10 so that high precision and high data rate notifications need not to be conveyed over large parts of the network. Only when a (local) second grid process 92 determines that a (remote) first grid process 91 needs to be involved, such signalling may be initiated.

Figure 2A:
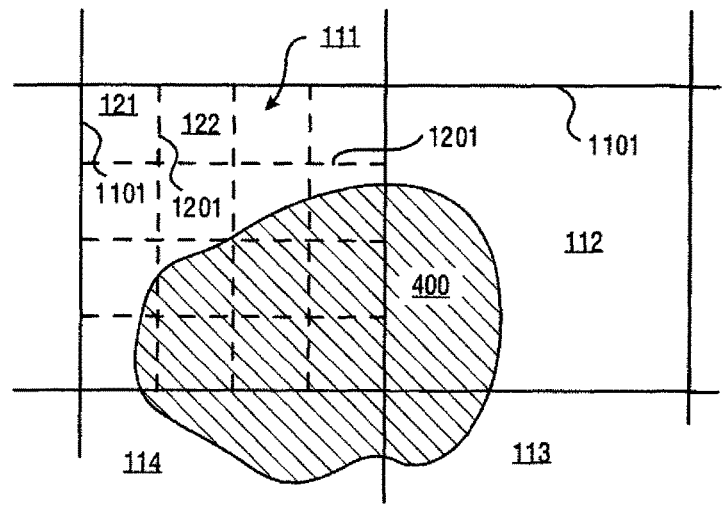
FIGS. 2A to 2C show schematic views of coexistence scenarios of a first and second grid according to further embodiments of the present invention.
Figure 2B:
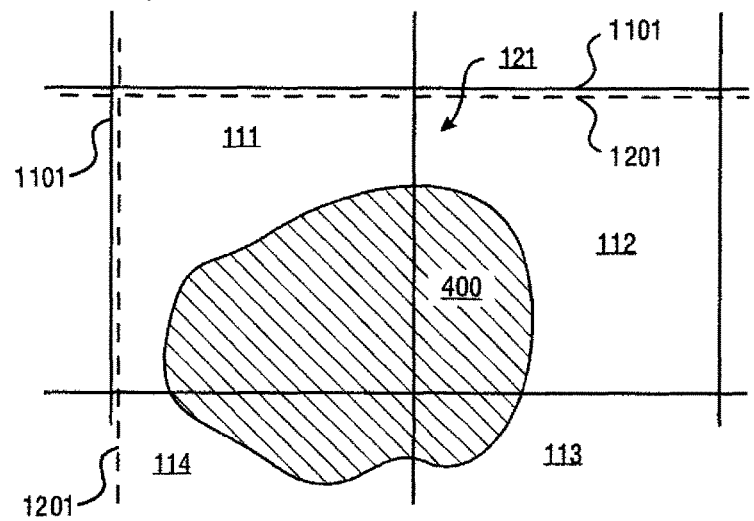
Figure 2C:
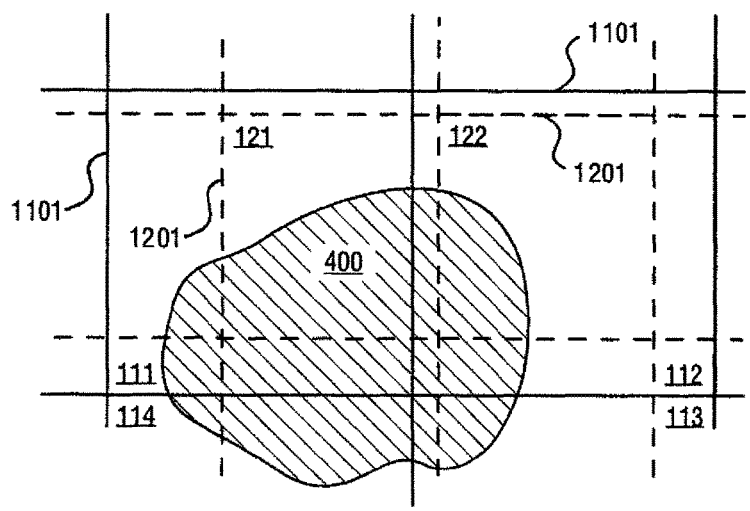

FIGS. 2A to 2C show schematic views of coexistence scenarios of a first and second grid defined by a first and second grid process, respectively, according to further embodiments of the present invention. The grids cover a service area 400 as a possible target area for a network service. As can be seen, the service area 400 is covered by tiles 111 to 114 of the first grid defined by the first grid process and tiles of the second grid defined by the second grid process.

FIG. 2A shows a corresponding first embodiment in which tiles 111, 112, 113, and 114 of a first grid are formed by first grid lines 1101 and tiles 121, 122 of a second grid are formed by second grid lines 1201. In this embodiment, the first grid and the second grid are related to each other in that the size of the tiles of the second grid is determined based on the size of the tiles of the first grid. For example, this can be done by dividing the size of each tile of the first grid with a certain division coefficient.

Further, in this embodiment the first grid and the second grid are related to each other in that the position of the second grid is determined with relation to the position of the first grid. In one example, this can be achieved by determining a reference point of the second grid based on a reference point of the first grid. As a result, at least some of the second grid lines 1201 overlap with at least some of the first grid lines 1101. Advantageously, the second grid process has knowledge of the size of the tiles of the first grid and has knowledge on the reference position of the first grid. In this embodiment the size of the tiles 121, 122 is smaller than the size of the tiles 111, 112, 113, and 114 of the first grid.

FIG. 2B shows a second embodiment in which the size of tile 121 of the second grid formed by grid lines 1201 is bigger than the size of the tiles 111, 112, 113, and 114 of the first grid formed by grid lines 1101. In this embodiment the first grid and the second grid are related to each other in that the size of the tiles of the second grid is determined based on the size of the tiles of the first grid. In this embodiment this is done by multiplying the size of each tile of the first grid with a certain multiplication coefficient. Further, in this embodiment the first grid and the second grid are related to each other in that the position of the second grid is determined with relation to the position of the first grid. In one example this may be done by determining a reference point of the second grid based on a reference point of the first grid. As a result at least some of the second grid lines 1201 again overlap with at least some of the first grid lines 1101 (for clarity the overlap is depicted with the small distance between some of the first grid lines 1101 and some of the second grid lines 1201). As a result, the second grid can be employed as a dynamic grid either providing a finer resolution (cf. FIG. 2A) or a more coarse resolution (cf. FIG. 2B) while maintaining the first grid fixed.

FIG. 2C shows a third embodiment in which the size of the tiles 121, 122 of the second grid formed by second grid lines 1201 is smaller than the size of the tiles 111, 112, 113, and 114 of the first grid formed by first grid lines 1101. The first grid and the second grid are not related to each other. This means that the size of the tiles of the second grid and the position of the second grid are determined independently from the size of the tiles of the first grid and the position of the first grid. The second grid lines 1201 may thus not overlap with the first grid lines 1101. The service area 400 is covered in this embodiment at least by tiles 111, 112, 113, and 114 of the first grid defined by the first grid process and tiles 121 and 122 of the second grid defined by the second grid process.

Although in FIG. 2C it is depicted that the size of the tiles of the second grid is smaller than the size of the tiles of the first grid, the present invention is not limited to this, but the size of the tiles of the second grid may be bigger than the size of the tiles of the first grid.

Generally, the present invention is not limited to these three coexistence scenarios as depicted in FIGS. 2A to 2C but any kind of relation and/or overlap and/or size of the first grid defined by the first grid process and the second grid defined by the second grid process is possible.

Accordingly, the embodiments of the present invention introduce a flexible hierarchy for grid management in which the first grid is defined by the first grid process and managed independently from the second grid which is defined by and managed by the second grid process. In this way the second grid process can define the second grid for individual mobile terminal or a small group or a subgroup of mobile terminals. For instance, the second grid process can adapt the size of the tiles of the second grid in respect to the size of the tiles of the first grid defined by the first grid process for an individual mobile terminal. In this way the individual mobile terminal will be provided with the network service employing the second grid process only, the first grid process only or the first and second grid process in combination and the other mobile terminals inside the service area will be provided with a network service employing the first grid process.

Figure 3:
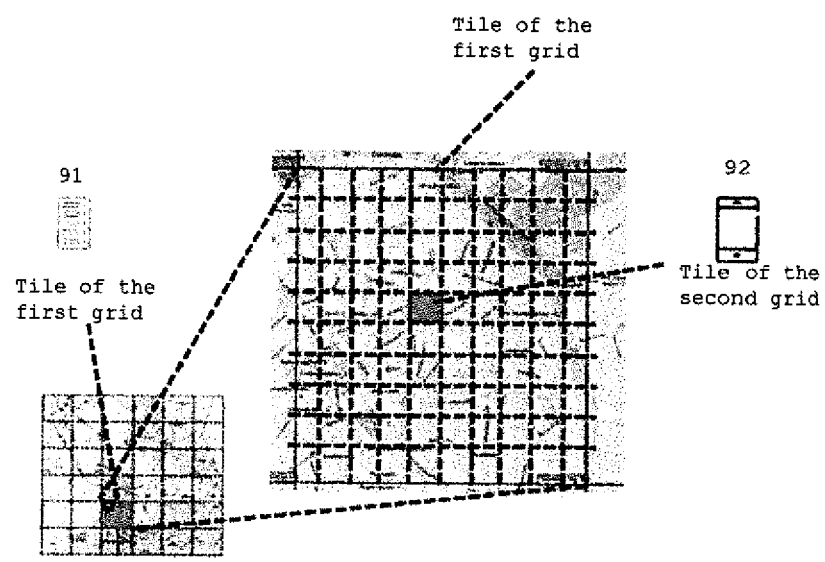
FIG. 3 shows a schematic view of a first and a second grid according to a further embodiment of the present invention.

FIG. 3 shows a schematic view of the first and the second grid according to a further embodiment of the present invention. The first grid process 91 defines a first grid with first grid lines. The first grid covers at least a part of the service area (not shown in the figure) with one or more tiles framed by first grid lines (shown in the left part). The service area is a part of a geographical area shown with the geographical map. The second grid process 92 defines a second grid with second grid lines. The second grid covers at least a part of the service area with one or more tiles framed by second grid lines. In this embodiment the size of the tiles of the second grid is smaller than the size of the tiles of the first grid as seen in the right diagram. The size of the tiles of the second grid is determined for example by dividing the size of each tile of the first grid with a certain division coefficient. Further, the position of the second grid is determined with relation to the position of the first grid. For example a reference point for the second grid is determined based on a reference point of the first grid.

Figure 4:
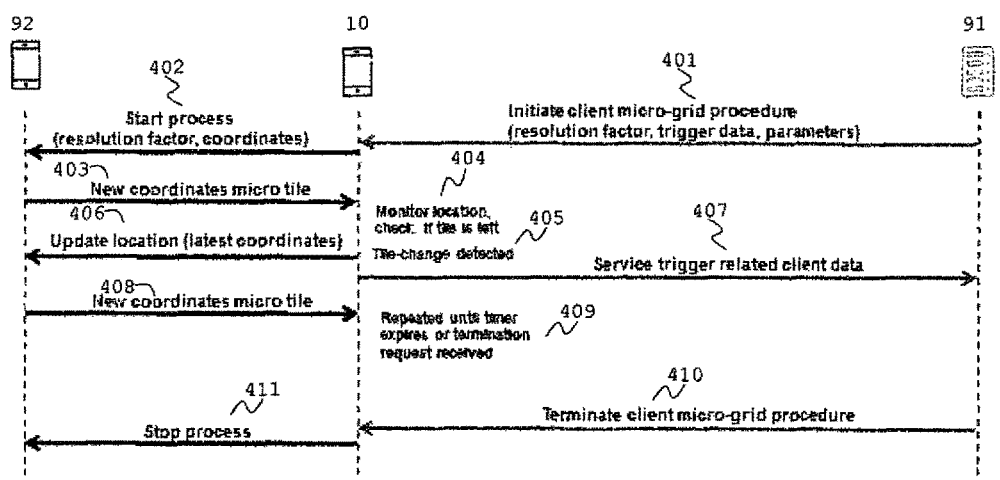
FIG. 4 shows a schematic view of a messaging diagram related to the definition of a second grid by the second grid process according to a further embodiment of the present invention.

FIG. 4 shows a schematic view of messaging diagram related to the definition of the second grid by the second grid process according to a further embodiment of the present invention. Here it is assumed that the mobile terminal 10 has access to a satellite-supported positioning service 50, such as the ones known by Global Positioning System (GPS), Galileo, Glonass, or other services that allow for a determination of the mobile terminal's geographical position. Further the mobile terminal can access an associated mobile communication network. It is also assumed that the size of the tiles of the second grid is smaller than the size of the tiles of the first grid.

Correspondingly hereafter, the second grid process 92, the second grid, the second grid lines and second grid information are referred to as a "micro-grid" process, with a corresponding micro-grid, micro-grid lines and micro-grid information. Likewise, the first grid process 91, the first grid, the first grid lines and the first grid information are referred to as a "macro-grid" process, with a corresponding macro-grid, macro-grid lines and macro-grid information. It is further assumed that the macro-grid process 91 has forwarded to the mobile terminal 10 macro-grid information. The macro-grid information indicates geographical position of the macro-grid lines. The macro-grid information may comprise (possibly individual) reference point information and information on the respective grid spacing. In this way the mobile terminal 10 is aware of the tile of the macro-grid it is currently located in, for instance by a GPS data set including corresponding longitude/latitude.

The macro-grid process 91 initiates client micro-grid procedure in step 401. The initiation of client micro-grid procedure involves the macro-grid process 91 forwarding to the mobile terminal 10 a trigger message. The trigger message may be issued by the network service 40 that forwards the trigger message to macro-grid process 91 that in turn forwards the trigger message to the mobile terminal 10. The trigger message may comprise a request for the mobile terminal 10 to provide a position dependent data to the first grid process 91. In different embodiments the trigger message may comprise a request for the mobile terminal 10 to support a network service 40. The trigger message may further comprise information about the required resolution factor of the position dependent data or the network service. The trigger message may further comprise a service trigger data.

The service trigger data may be a condition, that when satisfied, the position dependent data is forwarded to the macro-grid process 91 and/or the micro-grid process 92 and/or the mobile terminal 10 supports the network service 40. The condition may be an event such as tile change by the mobile terminal 10 i.e. the mobile terminal crossing a grid line. The grid line may be a macro-grid line or a micro-grid line. Upon occurrence of the event i.e. the mobile terminal 10 crossing a grid line, the mobile terminal 10 may determine which type of grid line was crossed (i.e. a first or second, or, respectively, micro or macro grid line) and provides position and/or crossing dependent data to the micro-grid process 92 and/or macro-grid process 91 and/or supports the network service 40. Another example of the event is the mobile terminal 10 reaching a specific geographical location inside the service area, or entering into a specific tile. The event may be also a time event such as expiration of a predetermined time period.

The trigger message may also comprise other parameters relevant to the comprised request. One example parameter is duration of the micro-grid procedure. The duration of the micro-grid procedure determines the time period of coexistence of the macro-grid and the micro-grid. In one embodiment the duration of the micro-grid procedure can be a predetermined time period. For example, the duration of the micro-grid procedure is set to a specified time period such as 1 minute. In a different embodiment the duration of the micro-grid procedure can be set to an unspecified time period. For example, the micro-grid procedure lasts until the mobile terminal 10 crosses a macro-grid line of the macro-grid or the mobile terminal 10 reaches the end of the macro-grid.

In response to receiving the trigger message the mobile terminal 10 in step 402 starts a process for defining the micro-grid by forwarding a message to the micro-grid process 92. The forwarded message may be the trigger message received form the macro-grid process 91 or may be a different message comprising the resolution factor, comprised in the trigger message and information on the geographical position of the mobile terminal 10. The information on the geographical position of the mobile terminal 10 may comprise the coordinates of the mobile terminal 10 including longitude/latitude. The message may further comprise the service trigger data and/or other parameters comprised in the trigger message such as the duration of the micro-grid procedure.

The micro-grid process 92 determines whether the size of the tile in which the mobile terminal 10 is currently located can comply with the required resolution factor comprised in the message forwarded from the mobile terminal 10 in step 402. If the micro-grid process 92 determines that the size of the tile in which the mobile terminal 10 is currently located does not comply with the required resolution factor, the micro-grid process 92 defines a micro-grid. The defining of the micro-grid involves determining the size of the tiles of the micro-grid and determining a reference position of the micro-grid. In some embodiments the determination of the size of the tiles of the micro-grid may be based on the information about the required resolution factor comprised in the message forwarded from the mobile terminal 10 in step 402. If for example the tile of the macro-grid in which the mobile terminal is currently located has size of 1 km×1 km and the requested resolution factor is 10 m the micro-grid process 92 calculates the micro-grid by dividing a tile of the macro-grid into 100×100 new tiles of the micro-grid with size of each tile of 10 m×10 m.

In this embodiment, the micro-grid process 92 determines the granularity of the micro-grid, i.e. the size of the tiles of the micro-grid based on the information about the requested resolution factor comprised in the message forwarded from the mobile terminal 10 in step 402 and the granularity of the macro-grid. Advantageously, the micro-grid process has knowledge of the size of the tiles of the macro-grid and has knowledge on the reference position of the macro-grid. In another embodiment the micro-grid process determines the granularity of the micro-grid independently from the information on the requested resolution factor and the granularity of the macro-grid.

Further, the micro-grid process 92 sets the service trigger based on the service trigger data comprised in the message forwarded from the mobile terminal 10. In this embodiment the service trigger is the mobile terminal crossing a micro-grid line. The micro-grid process 92 forwards in step 403 to the mobile terminal micro-grid information comprising geographical information position of the micro-grid lines. The micro-grid information may comprise (possibly individual) reference point information and information on the respective grid spacing. In this way the mobile terminal is aware of the tile of the micro-grid it is currently located in, for instance by a GPS data set including corresponding longitude/latitude. The mobile terminal 10 monitors a crossing of a grid line in step 404. Further, the mobile terminal 10 monitors its location by measuring position information by using the satellite supported positioning system 50. The mobile terminal 10 determines the crossing of the grid line based on the macro- and micro-grid information and on its position information. The mobile terminal 10 checks if it leaves the current tile based on the monitoring of crossing of a grid line and monitoring of its location.

When the mobile terminal 10 detects a tile change in step 405, as described above the mobile terminal determines whether the crossed grid line is a macro-grid line or a micro-grid line for notifying correspondingly the macro-grid process 91 and/or the micro-grid process 92. The mobile terminal generates a notification for forwarding it to the macro-grid process 91 and/or the micro-grid process 91. The notification can comprise crossing information. The crossing information can be position information about the latest coordinates of the mobile terminal 10 or any other information that indicates that the mobile terminal has crossed a grid line, i.e. the mobile terminal has left the tile defined by that grid line. The notification can further comprise a time stamp of the crossing information indicating the time at which the mobile terminal 10 crossed the grid line and/or mobile terminal ID. The time stamp also indicates the time at which the mobile terminal 10 measured the position dependent data with the use of the satellite supported positioning service 50. In some embodiments the crossing information comprises information identifying the tile i.e. tile ID information instead of position information.

When the crossed line is a micro-grid line the mobile terminal forwards in step 406 the notification to the micro-grid process 92 for updating its location. In general the mobile terminal notifies the micro-grid process in step 406 of its latest coordinates. When the crossed line is a macro-grid line the mobile terminal 10 determines whether a service trigger for forwarding the notification to the macro-grid process 91 is met. In one embodiment such service trigger may be the mobile terminal 10 crossing a macro-grid line. In other embodiment such service trigger may be expiration of a predetermined time period. If the service trigger is met, the mobile terminal 10 forwards the generated notification in step 407 to the macro-grid process 91.

The micro-grid process 92 receives the notification and in response to receiving the notification forwards in step 408 to the mobile terminal further micro-grid information. In some embodiments, the further micro-grid information comprises information indicating geographical position, for instance coordinates of the new micro-tile of the micro-grid in which the mobile terminal 10 is located upon crossing the grid line. In other embodiments the further micro-grid information comprises information indicating a geographical position of the new tile of the macro-grid in which the mobile terminal is located upon crossing the grid line. Such situation may occur when the crossed grid line is a micro-grid line overlapping a macro-grid line. In these embodiments the micro-grid process 92 notifies the macro-grid process 91 that the mobile terminal is located in a new macro-tile.

Each time the mobile terminal 10 crosses a micro-grid line the mobile terminal forwards a notification to the micro-grid process 92 for updating its location. In response to receiving the notification, the micro-grid process 92 forwards further micro-grid information comprising coordinates of the new micro-tile to the mobile terminal 10. The micro-grid process forwards to the mobile terminal 10 further micro-grid information (step 409) until a condition is satisfied. In some embodiments the condition may be an expiration of a timer. In some embodiments the timer is set based upon information indicating the duration of the micro-grid procedure comprised in the trigger message forwarded in step 401 from the micro-grid process 91 to the mobile terminal 10. For example if the duration of the micro-grid procedure is 1 minute the timer is set to 1 minute. The micro-grid procedure is terminated when the timer expires. In a different embodiment the duration of the micro-grid procedure can be set to an unspecified time period. For example, the micro-grid procedure terminates when the mobile terminal 10 crosses a macro-grid line of the macro-grid or the mobile terminal 10 reaches the end of the macro-grid.

In different embodiments the condition can be receiving a termination request. In step 410 the mobile terminal 10 receives from the first grid process 91 a request to terminate the micro-grid procedure. In step 411 the mobile terminal 10 forwards the request for terminating the micro-grid procedure to the micro-grid process 92. In response to this request, the micro-grid process 92 terminates the micro-grid procedure.

Figure 5:
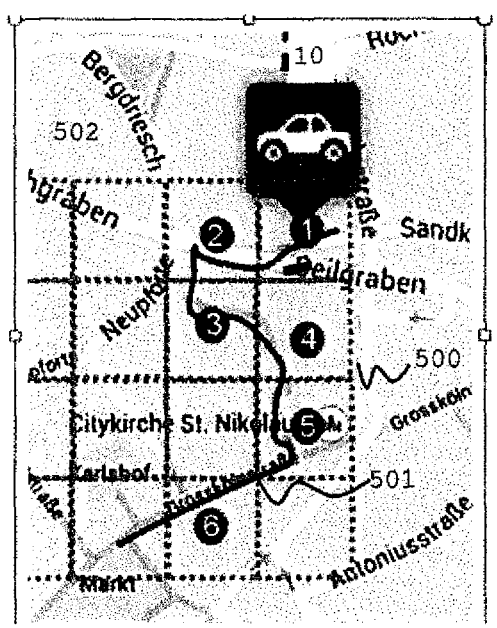
FIG. 5 shows a schematic view of measuring position dependent data by a mobile terminal according to a further embodiment of the present invention.

A further embodiment of the present invention for measuring position dependent data by the mobile terminal 10 is described in connection with FIG. 5. For clarity FIG. 5 shows only the micro-grid 500 covering at least a part of the service area (not shown). The service area is a part of a geographical area shown with the geographical map 502 of a particular city area. The vehicle/mobile terminal 10 passes a certain route 501, indicated with the solid line in the figure. The mobile terminal 10 measures position dependent data when the service trigger has been met. In one embodiment such service trigger is crossing a micro-grid line. The vehicle/mobile entity in the figure passes from tile 1 to tile 2, to tile 3, to tile 4 to tile 5 to tile 6 and etc. Tiles 1, 2, 3, 4, 5 and 6 are tiles from the micro-grid 500.

Each time the vehicle/mobile terminal 10 passes from one tile into the other tile i.e. crosses a micro-grid line the mobile terminal measures position dependent data. Such measuring of position dependent data when the mobile terminal 10 crosses a micro-grid line may be advantageous for some network services when the vehicle/mobile terminal 10 is not moving very fast. In the above described embodiment the measured position dependent data are reduced to six data sets independently from the vehicle speed and the travel time of the vehicle. In this way the number of measurements is reduced causing a saving of battery power at the mobile terminal. Further, the volume of data and the network bandwidth required for signalling this data is reduced. Alternatively the mobile terminal 10 measures the position dependent data at predetermined time intervals.

In this embodiment the mobile terminal 10 forwards the measured position dependent data to the micro-grid process 92. The micro-grid process 92 collects and saves the forwarded position dependent data. The micro-grid process 92 forwards the collected position dependent data to the macro-grid process 91 in response to a received request and/or fulfillment of a certain condition. In some embodiments the micro-grid process 92 receives a request from the macro-grid process 91 to forward the collected position dependent data. In other embodiments the micro-grid process 92 forwards the collected position dependent data to the macro-grid process 91 when a condition is fulfilled. Such condition is crossing of a grid line of the macro-grid by the mobile terminal 10. A different condition may be crossing of a particular micro-grid line by the mobile terminal 10 or reaching a specific grid element of the macro- and/or the micro-grid by the mobile terminal 10. In some embodiments the condition for collecting position dependent data by the micro-grid process 92 may be unrelated to the condition for forwarding the collected position dependent data to the micro-grid process 91. In some embodiments the two conditions may be related to each other. For example, according to the condition the micro-grid process 92 collects the measured position dependent data each time the mobile terminal 10 crosses a micro-grid line and forwards the position dependent data to the macro-grid process 91 when the mobile terminal crosses 10 a macro-grid line.

Alternatively in other embodiments the micro-grid process 92 forwards the collected position dependent data at the expiration of predetermined time intervals. The duration of these time intervals may be forwarded from the macro-grid process 91 to the micro-grid process 92. In still further embodiments the micro-grid process 92 may decide when to forward the collected location dependent data. As an example, when the buffered memory of the entity that carries out the micro-grid process 92 is occupied with saved collected position dependent data until certain percentage the micro-grid process 92 may decide to forward the collected position dependent data to the macro-grid process 91.

In the embodiments described above the macro-grid process 91 initiates the micro-grid procedure for at least one mobile terminal 10. The present invention is not limited only on this but the macro-grid process 91 may initiate the micro-grid procedure for more than one mobile terminal. In the embodiments described above a macro-grid process 91 i.e. a first grid process and a micro-grid process 92 i.e. a second grid process were described coexisting in parallel. The present invention is not limited only on this but a plurality of grid processes may coexist in parallel.

Figure 6:
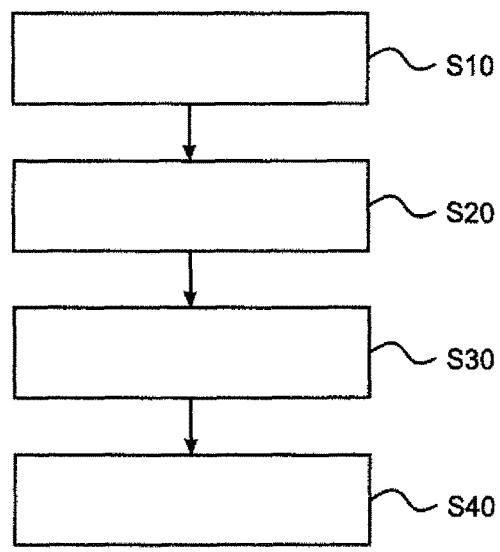
FIG. 6 shows a flowchart representation of method embodiment of the present invention.

FIG. 6 shows a flowchart representation of method embodiment of the present invention. This method embodiment is for providing a network service to at least one mobile terminal inside a service area, the at least one mobile terminal being arranged to communicate with a communication network, the service area being a part of a geographical area that is covered by the communication network. The method comprises a step S10 of defining, by a first grid process, a first grid with first grid lines, the first grid covering at least a part of the service area with one or more tiles framed by the first grid lines. The method comprises a step S20 of defining, by a second grid process, a second grid with second grid lines, the second grid covering at least a part of the service area with one or more tiles framed by the second grid lines. The method comprises a step S30 of monitoring a crossing, by the at least one mobile terminal, of a grid line. The method also comprises a step S40 of determining whether said grid line is a first grid line or a second grid line for notifying correspondingly the first grid process and/or the second grid process.

Figure 7:
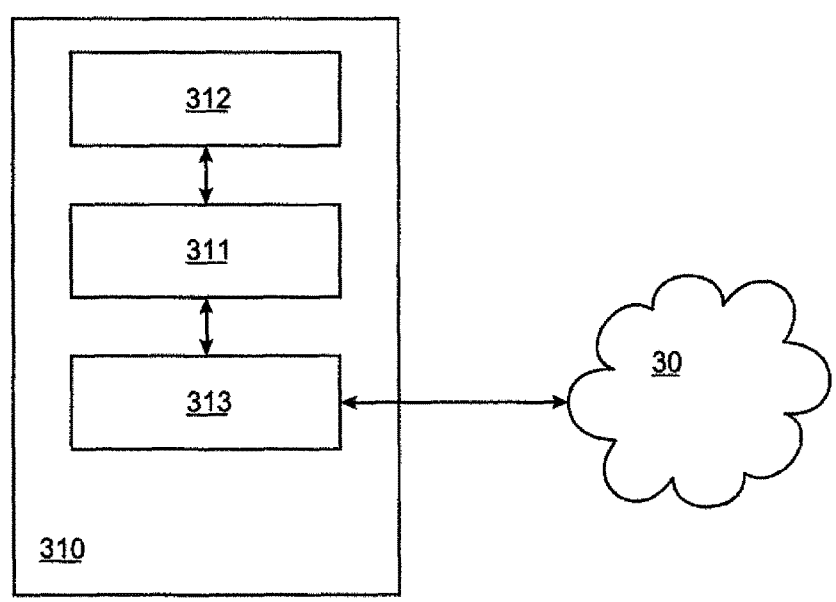
FIG. 7 shows a schematic view of a network entity in communication with a network according to another embodiment of the present invention.

FIG. 7 shows a schematic view of a network entity in communication with a network according to another embodiment of the present invention. In the sense of the present invention, an entity can be any of a dedicated piece of hardware, a share of hardware that is used by various processes and tasks, a collection of distributed pieces or shares of hardware. In this way, involved processing units and possibly also memory units can be dedicated, shared, or distributed.

According to this embodiment a network entity 310 is configured to provide a network service to at least one mobile terminal inside 10 a service area, the at least one mobile terminal 10 being arranged to communicate with a communication network, the service area being a part of a geographical area that is covered by the communication network. The network entity comprises a processing unit 311 that can execute code stored in a memory unit 312. In this way, the code may instruct the processing unit 311 to define, as part of a first grid process, a first grid with first grid lines, the first grid covering at least a part of the service area with one or more tiles framed by the first grid lines; to define, as part of a second grid process, a second grid with second grid lines, the second grid covering at least a part of the service area with one or more tiles framed by the second grid lines; to cause a monitoring, by the at least one mobile terminal, of a crossing of a grid line and to cause a determining whether said grid line is a first grid line or a second grid line for notifying correspondingly the first grid process and/or the second grid process.

The network entity 310 may also comprise a communication unit 313 that is configured to communicate with a network system, such as the network 30 of the other embodiments of the present invention. Specifically, the communication unit 313 may be employed for conveying first and/or second grid information to the target devices, and for causing the monitoring and/or determining. Especially the latter two may involve communicating code and/or instructions toward the position of execution of the respective grid process. For example, the communication unit 313 may be employed to push an application toward a mobile terminal for executing the second grid process.

The embodiments of the present invention can provide several advantages over the conventional techniques. In particular, by defining a grid for individual mobile terminals or a small group or a small subgroup of mobile terminals, network services that require high accuracy can be realised in a way that network bandwidth can be effectively saved. Further, position dependent data can be measured in a way that reduces the battery power consumption of the mobile terminal. Still further the volume of the measured data is reduced and the network bandwidth required for forwarding this data to an entity of the communication network is also reduced.

Although detailed embodiments have been described, these only serve to provide a better understanding of the invention defined by the independent claims, and are not to be seen as limiting.

The invention claimed is:

1. A method of providing a network service to at least one mobile terminal inside a service area, the at least one mobile terminal being configured to communicate with a communication network, the service area being a part of a geographical area that is covered by the communication network, the method comprising:
   defining, by a first grid process, a first grid with first grid lines; the first grid covering at least a part of the service area with one or more tiles framed by the first grid lines;
   defining, by a second grid process, a second grid with second grid lines; the second grid covering at least a part of the service area with one or more tiles framed by the second grid lines;

causing a monitoring, by the at least one mobile terminal, of a crossing of a grid line;
causing a determining whether the crossed grid line is a first grid line or a second grid line; and
causing a notifying of the corresponding first grid process and/or second grid process.

2. The method of claim 1, wherein the first grid process is running at a communication network side and the second grid process is caused to run at a mobile terminal side.

3. The method of claim 2, further comprising issuing a trigger message towards the mobile terminal side for running the second grid process.

4. The method of claim 3, wherein the trigger message comprises one or more of:
a request to provide location dependent data;
information on duration of the second process; and
information on a resolution of the second grid.

5. The method of claim 1:
wherein the second grid process comprises collecting and/or processing data in response to crossing a second grid line; and
further comprising issuing a request and/or defining an event that triggers forwarding the collected and/or processed data towards the network entity.

6. The method of claim 1, further comprising:
forwarding, by the first grid process, first grid information indicating geographical position of the first grid lines to the at least one mobile terminal; and
causing forwarding, by the second grid process, second grid information indicating geographical position of the second grid lines to the at least one mobile terminal.

7. A non-transitory computer readable recording medium storing a computer program product, the computer program product comprising software instructions which, when run on processing circuitry of a network entity of a communication network, causes the network entity to perform the method of claim 1.

8. A network entity providing a network service to at least one mobile terminal inside a service area, the at least one mobile terminal being configured to communicate with a communication network, the service area being a part of a geographical area that is covered by the communication network, the network entity comprising:
processing circuitry;
memory containing instructions executable by the processing circuitry whereby the network entity is operative to:
define, as part of a first grid process, a first grid with first grid lines; the first grid covering at least a part of the service area with one or more tiles framed by the first grid lines;
define, as part of a second grid process, a second grid with second grid lines; the second grid covering at least a part of the service area with one or more tiles framed by the second grid lines;
cause a monitoring, by the at least one mobile terminal, of a crossing of a grid line;
cause a determining whether the crossed grid line is a first grid line or a second grid line; and
cause a notifying of the corresponding first grid process and/or second grid process.

9. The network entity of claim 8, wherein the instructions are such that the network entity is operative to run the first grid process and to cause to run the second grid process at a mobile terminal side.

10. The network entity of claim 9, wherein the instructions are such that the network entity is operative to issue a trigger message towards the mobile terminal side for running the second grid process.

11. The network entity of claim 10, wherein the trigger message comprises one or more of:
a request to provide location dependent data;
information on duration of the second process; and
information on a resolution of the second grid.

12. The network entity of claim 8:
wherein the second grid process comprises collecting and/or processing data in response to crossing a second grid line;
wherein the instructions are such that the network entity is operative to issue a request and/or define an event that triggers forwarding the collected and/or processed data towards the network entity.

13. The network entity of claim 8, wherein the instructions are such that the network entity is operative to:
forward, to the at least one mobile terminal, first grid information indicating geographical position of the first grid lines; and
cause forwarding to the at least one mobile terminal second grid information indicating geographical position of the second grid lines.

14. A method of providing a network service to a mobile terminal inside a service area, the mobile terminal being configured to communicate with a communication network, the service area being a part of a geographical area that is covered by the communication network, the method comprising:
receiving, by the mobile terminal and from a first grid process, first grid information indicating geographical position of first grid lines; the first grid covering at least a part of the service area with one or more tiles framed by the first grid lines;
receiving, by the mobile terminal and from a second grid process, second grid information indicating geographical position of second grid lines; the second grid covering at least a part of the service area with one or more tiles framed by the second grid lines;
monitoring a crossing of a grid line;
determining whether the crossed grid line is a first grid line or a second grid line; and
notifying the corresponding first grid process and/or second grid process.

15. The method of claim 14, further comprising:
generating a notification in response to the at least one mobile terminal crossing the grid line; and
forwarding the notification to the corresponding first or second grid process.

16. The method of claim 15, wherein the notification comprises crossing information, and wherein the crossing information comprises at least one of:
position information;
a time stamp; and
information identifying a tile.

17. The method of claim 14, wherein, if the grid line is a first grid line, the mobile terminal determines whether a service trigger for forwarding the notification to the first grid process is met; and if the service trigger is met, the mobile terminal forwards a generated notification to the first grid process.

18. A non-transitory computer readable recording medium storing a computer program product, the computer program product comprising software instructions which, when run on processing circuitry of a network entity of a mobile terminal, causes the mobile terminal to perform the method of claim 14.

19. A mobile terminal for receiving a network service to at inside a service area, the mobile terminal being configured to communicate with a communication network, the service area being a part of a geographical area that is covered by the communication network, the mobile terminal comprising:

processing circuitry;

memory containing instructions executable by the processing circuitry whereby the mobile terminal is operative to:

receive, from a first grid process, first grid information indicating geographical position of first grid lines; the first grid covering at least a part of the service area with one or more tiles framed by the first grid lines;

receive, from a second grid process, second grid information indicating geographical position of second grid lines; the second grid covering at least a part of the service area with one or more tiles framed by the second grid lines;

monitoring a crossing of a grid line;

determining whether the grid line is a first grid line or a second grid line; and notifying the corresponding first grid process and/or second grid process.

20. The mobile terminal of claim 19, wherein the instructions are such that the mobile terminal is operative to:

generate a notification in response to the at least one mobile terminal crossing the grid line; and forward the notification to the corresponding first and/or second grid process.

21. The mobile terminal of claim 20, wherein the notification comprises crossing information; wherein the crossing information comprises at least one of position information;

a time stamp; and information identifying a tile.

22. The mobile terminal of claim 19, wherein the instructions are such that the mobile terminal is operative to:

in response to the grid line being a first grid line, determine whether a service trigger for forwarding the notification to the first rid process is met; and if the service trigger is met, forward a generated notification to the first grid process.

* * * * *